United States Patent
Lee

(10) Patent No.: US 9,897,069 B2
(45) Date of Patent: Feb. 20, 2018

(54) ROOT AIRFOIL OF WIND TURBINE BLADE

(76) Inventor: Jang Ho Lee, Gunsan-si (KR)

( * ) Notice: Subject to any disclaimer, the term of this patent is extended or adjusted under 35 U.S.C. 154(b) by 495 days.

(21) Appl. No.: 14/417,757

(22) PCT Filed: May 11, 2012

(86) PCT No.: PCT/KR2012/003701
§ 371 (c)(1),
(2), (4) Date: Jan. 27, 2015

(87) PCT Pub. No.: WO2013/154226
PCT Pub. Date: Oct. 17, 2013

(65) Prior Publication Data
US 2015/0152837 A1 Jun. 4, 2015

(30) Foreign Application Priority Data

Apr. 13, 2012 (KR) .................. 10-2012-0038215

(51) Int. Cl.
*F03D 1/06* (2006.01)

(52) U.S. Cl.
CPC ...... *F03D 1/0641* (2013.01); *F05B 2240/301* (2013.01); *Y02E 10/721* (2013.01)

(58) Field of Classification Search
CPC .... F03D 1/0641; F03D 1/0633; F03D 1/0683; F03D 1/0675; F05B 2240/301; Y02E 10/721
USPC ...................................... 416/223 R
See application file for complete search history.

(56) References Cited

U.S. PATENT DOCUMENTS

| 5,474,425 A * | 12/1995 | Lawlor ................... F03D 1/065 416/223 R |
| 6,068,446 A | 5/2000 | Tangler et al. |
| 6,705,838 B1 * | 3/2004 | Bak ...................... F03D 1/0641 416/243 |
| 2008/0206055 A1 * | 8/2008 | Godsk .................. F03D 1/0641 416/147 |
| 2009/0074574 A1 * | 3/2009 | Godsk .................. F03D 1/0641 416/41 |
| 2009/0123289 A1 * | 5/2009 | Tangler .................. F01D 5/141 416/223 R |
| 2009/0285691 A1 * | 11/2009 | Grabau ................. F03D 1/0633 416/223 R |
| 2010/0008787 A1 * | 1/2010 | Godsk .................. F03D 1/0641 416/223 R |

(Continued)

FOREIGN PATENT DOCUMENTS

| KR | 10-0766729 B1 | 10/2007 |
| KR | 10-2008-0063085 A | 7/2008 |
| KR | 10-2009-0048668 A | 5/2009 |

(Continued)

OTHER PUBLICATIONS

International Search Report for PCT Application No. PCT/KR2012/003701.

*Primary Examiner* — Aaron R Eastman
(74) *Attorney, Agent, or Firm* — STIP Law Group, LLC

(57) ABSTRACT

A root airfoil of a wind turbine blade has a suction surface and a pressure surface formed at the upper portion and at the lower portion of a chord line which connects the leading edge and the trailing edge. The operating Reynolds number is 30,000 to 1,000,000, and the angle of attack of the airfoil is 0 to 21 degrees. The maximum lift coefficient is 0.8 to 1.1, and the minimum drag coefficient is 0.02 to 0.07.

3 Claims, 5 Drawing Sheets

(56) References Cited

U.S. PATENT DOCUMENTS

2010/0316500 A1* 12/2010 Blanton ................ F03D 1/0641
  416/223 R

FOREIGN PATENT DOCUMENTS

| KR | 10-2011-0092609 A | 8/2011 |
| KR | 10-1059784 B1 | 8/2011 |

* cited by examiner

[FIG. 1]

ROOT AIRFOIL OF WIND TURBINE BLADE

This research was supported by Basic Science Research Programs through the National Research Foundation of Korea (NRF) funded by the Ministry of Education (NRF-2016R1A6A1A03013567 and NRF-2017R1D1A3B06032145), and KETEP and MOTIE of Korea (No. 20173010024870).

TECHNICAL FIELD

The present invention relates to a cross-sectional shape of a root airfoil among airfoils of a blade used in a wind turbine, and more specifically, to a root airfoil of a wind turbine blade having a thickness ratio capable of enduring the load of the blade and having a high maximum lift coefficient and a high lift-to-drag ratio for stable operation.

BACKGROUND ART

As natural resources such as petroleum, coal, natural gas and the like are depleted together with development of industry and increase in population, a lot of studies on general wind turbines for generating electric energy using power of wind are under progress as an alternative energy source, and the range of use of the wind turbines is gradually expanded owing to low cost and eco-friendly reasons since the wind turbines use wind existing in the nature as an energy source.

A wind turbine of a prior art is described with reference to drawings.

Referring to FIG. 1, in a wind turbine 10 of the prior art, a blade 12 having a predetermined length is rotatably installed on the top of a high rising tower 11 built on the surface of the earth using a hub 14 as a medium. The hub 14 is connected to a nacelle 13, and the nacelle 13 is embedded with a gear box, a generator and a control device (not shown) inside thereof. In addition, the wind turbine 10 is configured such that rotating power of the blade 12 may reach the wind turbine 10 through the main shaft by way of the hub 14.

Referring to FIG. 2, the blade 12 obtains a three-dimensional shape by distributing a plurality of airfoil shapes in a span direction (length direction). It is general that a thick airfoil 12a is used toward the root of the blade 12 for structural stiffness and a thin airfoil having a superior lift-to-drag ratio (lift coefficient/drag coefficient) is used toward the tip of the blade 12.

Performance and efficiency of the wind turbine are determined by the shape of the airfoil configuring the cross section of the blade 12, and selecting an appropriate airfoil acts as a very important factor in a wind turbine operating for an extended period of time.

However, most of airfoils 12a currently used in a wind turbine are developed for airplanes, and taking for example the Reynolds number which is an important factor in fluid mechanics, the Reynolds number in an operating condition is about 6,000,000 in the case of an airplane, whereas it is only 500,000 to 1,600,000 in the case of a wind turbine, and thus there is a problem in that decrease in the performance of a wind turbine is induced if an airfoil used in a field of a completely different operating condition is used as a cross-sectional shape of the blade 11 of the wind turbine.

Furthermore, since the blade of a wind turbine is a large size having a span of ten meters or more and is not easy to clean although it is continuously exposed to contamination (dusts, dead bodies of insects, moisture, icing and the like), decrease in performance is expected due to the contamination.

Accordingly, a blade of further higher efficiency cannot be expected since an airfoil developed for airplanes is used as is without considering these effects of blade, and thus a countermeasure for this problem is required.

DISCLOSURE

Technical Problem

Therefore, the present invention has been made in view of the above problems, and it is an object of the present invention to improve performance and efficiency of a wind turbine by providing an airfoil having a shape specialized for the root part of the wind turbine which stably operate at a low wind speed by changing the shape of a root airfoil of a wind turbine blade.

Technical Solution

To accomplish the above object, according to one aspect of the present invention, there is provided a root airfoil of a blade of a small-scale wind turbine, the root airfoil having a suction surface and a pressure surface formed at an upper side and a lower side of a chord line which connects a leading edge and a trailing edge, in which an operating Reynolds number is 30,000 to 1,000,000, an angle of attack of the airfoil is 0 to 21 degrees, a maximum lift coefficient is 0.8 to 1.1, and a minimum drag coefficient is 0.02 to 0.07.

A maximum lift-to-drag ratio of the root airfoil is 12 to 34.

A maximum thickness ratio of the root airfoil is 22%.

The embodiments of the present invention may improve efficiency and performance of a wind turbine by optimizing the shape of a root airfoil of the wind turbine and provide a root airfoil with superior structural safety.

Advantageous Effects

According to the present invention, it is possible to improve performance and efficiency of a wind turbine and provide a root airfoil with a high structure stability by optimizing the shape of a root airfoil of a wind turbine blade.

MODE FOR INVENTION

Figure 1:
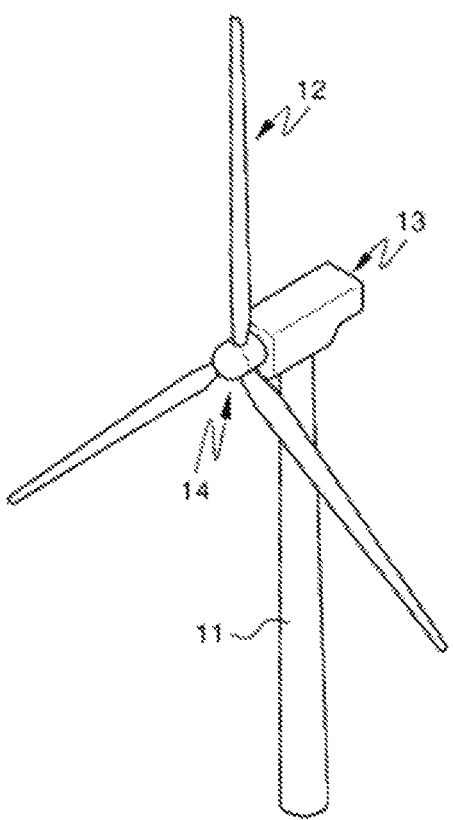
FIG. 1 is a perspective view showing a wind turbine of the prior art.
Figure 2:
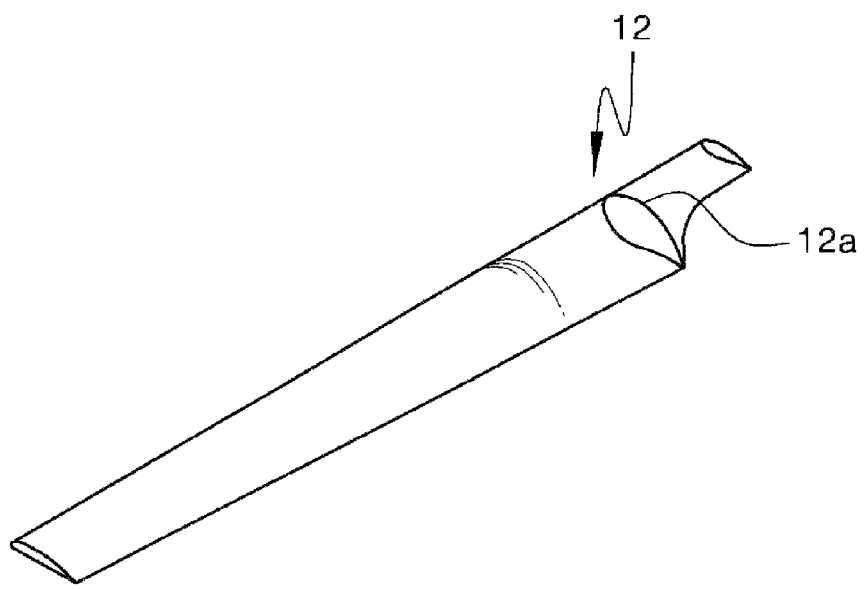
FIG. 2 is a perspective view showing a root airfoil of a wind turbine blade.
Figure 3:
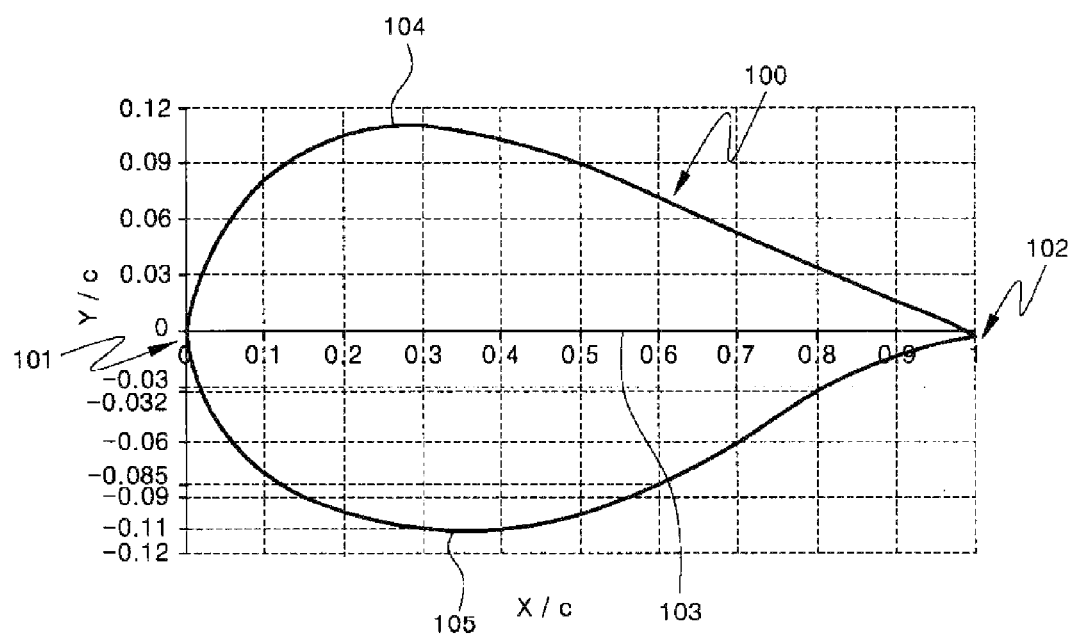
FIG. 3 is a cross-sectional view showing a root airfoil according to an embodiment of the present invention.

A root airfoil of a wind turbine blade according to an embodiment of the present invention will be hereafter described in detail, with reference to the accompanying drawings. FIG. 3 is a cross-sectional view showing a root airfoil according to an embodiment of the present invention.

Referring to FIG. 3, a root airfoil 100 according to an embodiment of the present, invention has a shape applied to the root of a blade, and structural safety and efficiency of a wind turbine are determined by the shape of the root airfoil 100.

The root airfoil 100 according to the present invention has a suction surface 104 and a pressure surface 105 formed at the upper side and the lower side of a chord line 103 which connects the leading edge 101 and the trailing edge 102.

The root airfoil 100 is a blade used at a wind speed of 15 m/s and has an operating Reynolds number designed in a range of 30,000 to 1,000,000 and a maximum thickness ratio of 22% to maximize aerodynamic performance. For reference, the maximum thickness ratio refers to a value obtained by dividing the thickness of the root airfoil 100 by the length of the chord line 103, and in this embodiment, it is described by limiting the length of the chord line 103 to one meter, and the maximum thickness of 22% means that a point at 22% of the one meter length of the chord line 103 starting from the leading edge 101 has a maximum thickness since the length of the chord line 103 is one meter.

Although it is advantageous to have a high thickness ratio for structural safety of the blade, since performance of the lift-to-drag ratio of the root airfoil can be decreased as the thickness ratio increases, the root airfoil has the thickness ratio described above in order to implement structural safety of the blade and optimum performance of the root airfoil considering stress design of a structure and performance of the root airfoil when the blade is designed.

For reference, a thickness ratio of 24% or higher is used as a thickness ratio of a general root airfoil for the reason of structural strength, and it is known that performance is improved as the thickness ratio is decreased.

Accordingly, a thickness ratio of 22% is used as the thickness ratio of the root airfoil 100 according to an embodiment of the present invention.

The root airfoil 100 according to an embodiment of the present invention has a maximum lift coefficient of 0.8 to 1.1, a minimum drag coefficient of 0.02 to 0.07 and a maximum lift-to-drag ratio in a range of 12 to 34, and the root airfoil 100 has the lift-to-drag ratio described above to minimize a bending moment at free ends. For reference, the lift-to-drag ratio refers to a ratio between a lift and a drag that the blade receives.

The root airfoil 100 is configured by combining the suction surface 104 and the pressure surface 105 distributed along the chord line 103, and the maximum thickness of the root airfoil 100 and the length of the chord line 103 are treated as one of important factors for determining performance of the root airfoil 100.

In addition, since the root airfoil 100 is designed in a range of an operating Reynolds number between 30,000 and 1,000,000, rotation of the blade can be easily accomplished even with a Reynolds number relatively smaller than 1,000,000 which is the Reynolds number of a root airfoil of a general small-scale wind turbine.

The root airfoil 100 according to an embodiment of the present invention is manufactured to have an angle of attack of 0 to 21 degrees and is characterized by having a minimum drag coefficient of 0.0182. Here, the angle of attack (AOA) refers to an angle between the chord line of the blade and relative wind, and the chord line refers to an imaginary straight line connecting the leading edge and the trailing edge of the blade. In addition, the relative wind refers to a direction in which the air relatively bumps into the blade when the blade moves forward into the air.

The root airfoil of a blade according to an embodiment of the present invention configured as described above is described with reference to experiment data comparing the shapes of the root airfoil of the present invention and the root airfoil of the prior art.

For reference, X/C shown on the X-axis denotes length of the chord line, and Y/C shown on the Y-axis denotes thickness of the root airfoil. For reference, the dotted line shows the cross-sectional shape of the tip root) airfoil of prior art 1, and the dot-dash line shows the cross-sectional shape of root airfoil of prior art 2.

Figure 4:
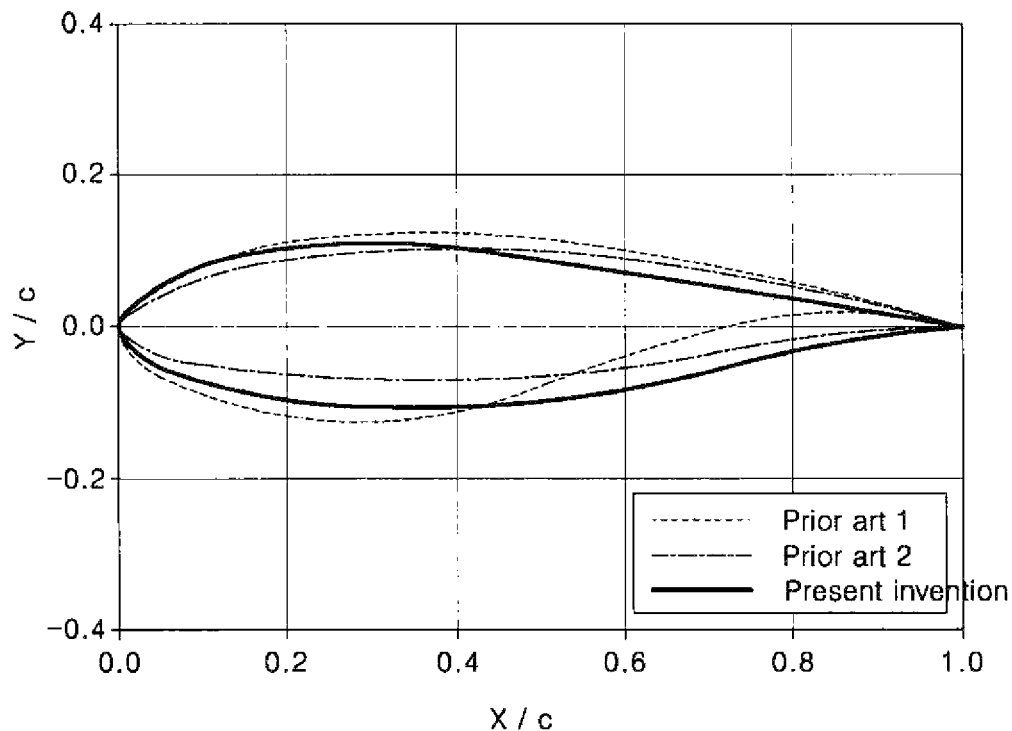
FIG. 4 is a view showing a result of comparing the shape of a root airfoil of a wind turbine blade according to an embodiment of the present invention and the shapes of root airfoils according to prior arts 1 and 2.

Referring to FIG. 4, since the root airfoil 100 of the present invention has a maximum thickness ratio of 22% (since the length of the chord line 103 is one meter, a point at 22% of the one meter length of the chord line 103 starting from the leading edge 101) and is manufactured at a thickness ratio different from the thickness ratio of 25% of the prior art 1 and the thickness ratio of 18% of the prior art 2. Particularly, it is understood that the suction surface 104 and the pressure surface 105 of the present invention are configured in a shape completely different from those of the prior arts 1 and 2.

The root airfoil of a blade according to an embodiment of the present invention will be described with reference to the experiment data comparing the lift coefficients of the root airfoil of the present invention and the root airfoil of the prior art. For reference, the experiment is performed after setting the Reynolds number according to the experiment to 30,000. For reference, the experiment on the lift coefficient is performed by comparing the lift coefficient of the present invention with that of prior art 3.

Figure 5:
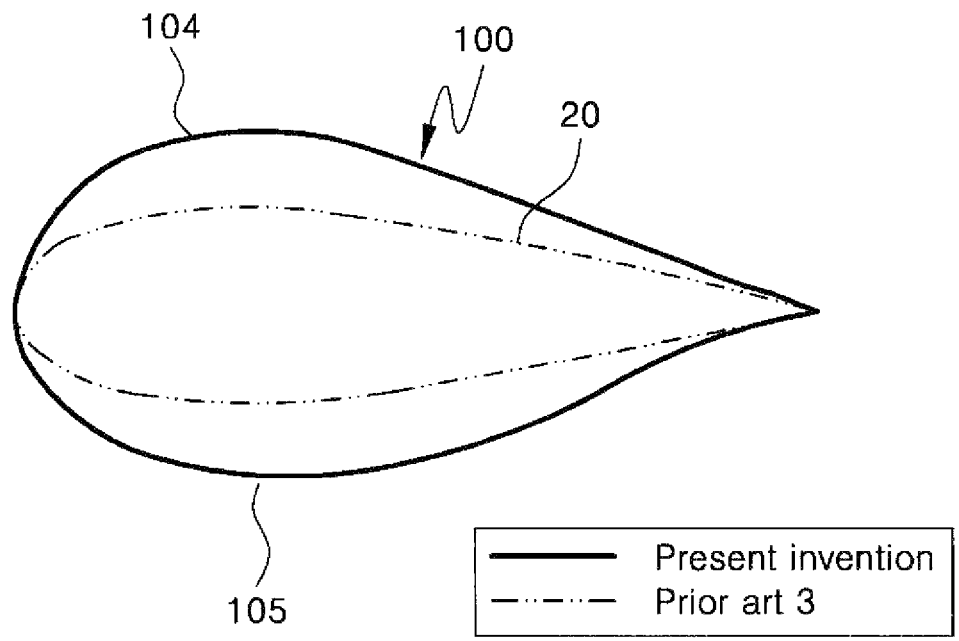
FIG. 5 is a view showing a result of comparing the shape of a root airfoil of a wind turbine blade according to an embodiment of the present invention and the shape of a root airfoil according to prior art 3.
Figure 6:
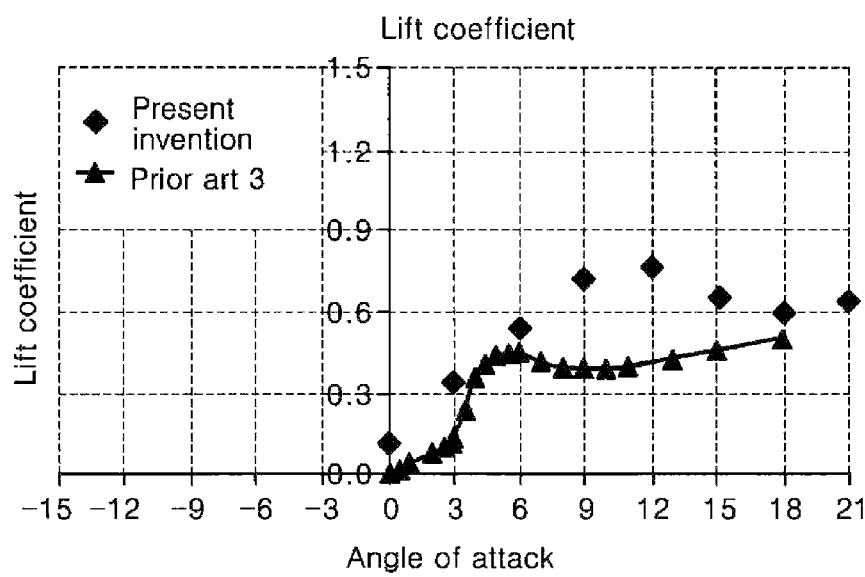
FIG. 6 is a graph showing a result of experiment performed on the lift coefficients of a root airfoil of a wind turbine blade according to an embodiment of the present invention and a root airfoil according to prior art 3.

Referring to FIGS. 5 and 6, if the root airfoil 100 according to the present invention is overlapped and compared with the root airfoil of the prior art 3, it is understood that there is a big difference in the suction surface 100 and the pressure surface 105 between the shapes of the present invention and the prior art 3.

In addition, since the angle of attack of the present invention has a range of angle between 0 and 21 degrees, the lift according to rotation of the blade is remarkably increased compared with that of the prior art 3, and thus even when the wind blowing to the wind turbine is weak, rotation of the blade can be further easily accomplished.

Contrarily, it is understood in the prior art 3 that the lift coefficient does not exceed 0.6 and is shown to be relatively low compared with the lift coefficient of the root airfoil 100 of the present invention.

The root airfoil of a blade according to an embodiment of the present invention will be described with reference to the experiment data comparing the drag coefficients of the root airfoil of the present invention and the root airfoil of the prior art.

Figure 7:
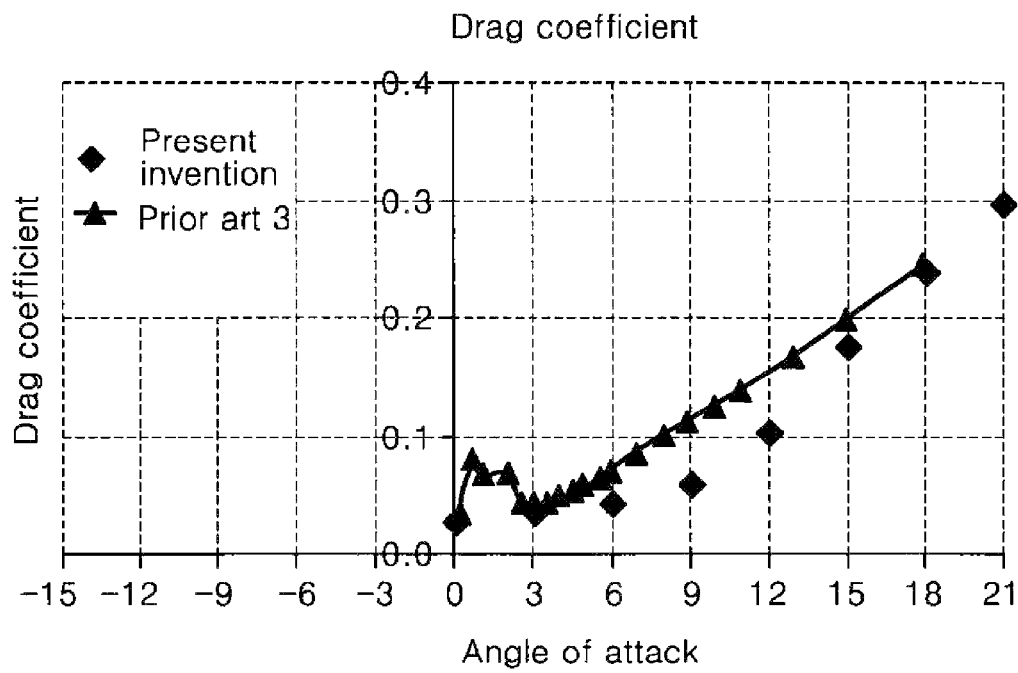
FIG. 7 is a graph showing a result of experiment performed on the drag coefficients of a root airfoil of a wind turbine blade according to an embodiment of the present invention and a root airfoil according to prior art 3.

Referring to FIG. 7, it is understood that the root airfoil 100 of the present invention generally has a drag coefficient smaller than the drag coefficient of the root airfoil 20 of the prior art 3 as a result of an experiment comparing the root airfoil 100 of the present invention with the root airfoil 20 of the prior art 3.

Accordingly, it is understood that when wind is blowing to the wind turbine at a low speed, resistance of the air moving along the surface of the root airfoil 100 is generated relatively smaller than that of the root airfoil 20 of the prior art 3, and the resistance applied to the root airfoil 100 is reduced.

The root airfoil of a blade according to an embodiment of the present invention will be described with reference to the experiment data comparing the lift-to-drag ratios of the root airfoil of the present invention and the root airfoil of the prior art.

Figure 8:
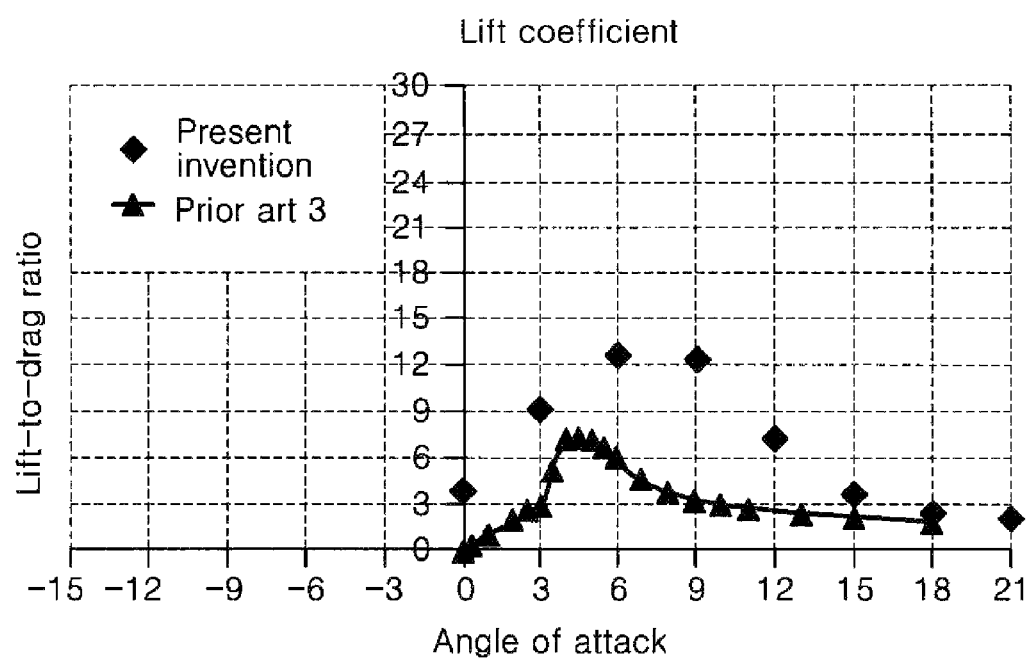
FIG. 8 is a graph showing a result of experiment performed on the lift-to-drag ratios of a root airfoil of a wind turbine blade according to an embodiment of the present invention and a root airfoil according to prior art 3.

Referring to FIG. 8, it is understood that when the Reynolds number is 30,000, the lift-to-drag ratio according to the root airfoil 100 of the present invention is relatively higher than that of the airfoil 20 of the prior art 3, and thus rotation of the blade can be smoothly accomplished even in a condition of a small wind power.

While the present invention has been described with reference to the particular illustrative embodiments, it is not to be restricted by the embodiments but only by the appended claims. It is to be appreciated that those skilled in the art can change or modify the embodiments without departing from the scope and spirit of the present invention.

INDUSTRIAL APPLICABILITY

The root airfoil of a wind turbine blade according to an embodiment of the present invention may be applied in the field of a blade of a small-scale wind turbine.

The invention claimed is:

1. A root airfoil of a wind turbine blade, the root airfoil having a suction surface and a pressure surface formed at an upper side and a lower side of a chord line which connects a leading edge and a trailing edge,
   wherein the pressure surface has contours expressed by coordinates (X/C, Y/C) substantially as follows: (0.0, 0.0), (0.3, −0.11), (0.6, −0.085), and (0.8, −0.032),
   wherein the X/C values are dimensionless coordinates that represent locations on the chord line and the Y/C values are dimensionless coordinates that represent heights from the chord line to points on the pressure surface or the suction surface,
   wherein an operating Reynolds number is 30,000 to 1,000,000, an angle of attack of the airfoil is 0 to 21 degrees, a maximum lift coefficient is 0.8 to 1.1, and a minimum drag coefficient is 0.02 to 0.07.

2. The root airfoil according to claim 1, wherein a maximum lift-to-drag ratio of the root airfoil is between 12 and 34.

3. The root airfoil according to claim 1, wherein a maximum thickness ratio of the root airfoil is 22%.

\* \* \* \* \*